United States Patent
Hasegawa et al.

(10) Patent No.: US 11,682,803 B2
(45) Date of Patent: Jun. 20, 2023

(54) SULFIDE ALL-SOLID-STATE BATTERY

(71) Applicant: TOYOTA JIDOSHA KABUSHIKI KAISHA, Toyota (JP)

(72) Inventors: Hajime Hasegawa, Susono (JP); Yuki Matsushita, Atsugi (JP); Yusuke Okuhata, Susono (JP); Mitsuru Tateishi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

(21) Appl. No.: 15/786,906

(22) Filed: Oct. 18, 2017

(65) Prior Publication Data

US 2018/0123196 A1 May 3, 2018

(30) Foreign Application Priority Data

Oct. 31, 2016 (JP) .............................. JP2016-213144

(51) Int. Cl.
  *H01M 10/653* (2014.01)
  *H01M 10/0562* (2010.01)
  (Continued)

(52) U.S. Cl.
  CPC ..... *H01M 10/653* (2015.04); *H01M 10/0472* (2013.01); *H01M 10/052* (2013.01);
  (Continued)

(58) Field of Classification Search
  CPC ............. H01M 10/613; H01M 10/653; H01M 10/654; H01M 10/655; H01M 10/659;
  (Continued)

(56) References Cited

U.S. PATENT DOCUMENTS

| 2006/0275666 | A1* | 12/2006 | Chang | ............... | H01M 10/0431 |
| | | | | | 429/223 |
| 2012/0301777 | A1* | 11/2012 | Ahn | .................... | H01M 2/0212 |
| | | | | | 429/163 |
| 2016/0156081 | A1* | 6/2016 | Wang | .................. | H01M 10/637 |
| | | | | | 429/50 |

FOREIGN PATENT DOCUMENTS

| JP | 2008-053196 A |   | 3/2008 |
| JP | 2009146657 A | * | 7/2009 |

(Continued)

OTHER PUBLICATIONS

Schiller, Michael. (2015). PVC Additives—Performance, Chemistry, Developments, and Sustainability—2.1 Lubricants. Hanser Publishers, (pp. 123-124, Table 2.2). (Year: 2015).*

(Continued)

*Primary Examiner* — William E McClain
*Assistant Examiner* — Kirsten B Tysl
(74) *Attorney, Agent, or Firm* — Oliff PLC

(57) ABSTRACT

A sulfide all-solid-state battery which is capable of absorbing heat by a heat absorbing layer at abnormal heat generation and maintaining capacity of a battery at a high level for a long time use is provided. The sulfide all-solid-state battery contains at least one unit cell, at least one heat absorbing layer, a battery case which accommodates the unit cell and the heat absorbing layer, the unit cell contains sulfide solid electrolyte, the heat absorbing layer contains at least one organic heat absorbing material selected from the group consisting of sugar alcohols and hydrocarbons, and the heat absorbing layer does not contain an inorganic hydrate.

16 Claims, 6 Drawing Sheets

(51) Int. Cl.
  *H01M 10/659*   (2014.01)
  *H01M 10/0585*  (2010.01)
  *H01M 10/052*   (2010.01)
  *H01M 10/613*   (2014.01)
  *H01M 10/04*    (2006.01)
  *H01M 10/654*   (2014.01)
  *H01M 10/655*   (2014.01)

(52) U.S. Cl.
  CPC ... *H01M 10/0562* (2013.01); *H01M 10/0585* (2013.01); *H01M 10/613* (2015.04); *H01M 10/654* (2015.04); *H01M 10/655* (2015.04); *H01M 10/659* (2015.04)

(58) Field of Classification Search
  CPC .......... H01M 10/0472; H01M 10/052; H01M 10/0562; H01M 10/0585; H01M 6/50
  See application file for complete search history.

(56) References Cited

FOREIGN PATENT DOCUMENTS

| | | | |
|---|---|---|---|
| JP | 2009-238705 | A | 10/2009 |
| JP | 2009-266402 | A | 11/2009 |
| JP | 2010-053196 | A | 3/2010 |
| JP | 2015-029036 | A | 2/2015 |
| JP | 2016-081635 | A | 5/2016 |
| JP | 2017-084460 | A | 5/2017 |
| KR | 10-2006-0115021 | A | 11/2006 |
| KR | 20130133444 | A * | 12/2013 |
| KR | 20160108987 | A * | 9/2016 |
| WO | WO-2014007215 | A1 * | 1/2014 ........ H01M 10/0562 |

OTHER PUBLICATIONS

JP2009146657A Ibuki Espacenet machine translation (Year: 2009).*
KR-20130133444-A Cho et al. Espacenet Machine Translation (Year: 2013).*
KR20160108987 A Jo et al., machine translation (Year: 2016).*
WO-2014007215-A1 Machine translation (Year: 2014).*

* cited by examiner

The nail coated with melted organic heat absorbing material.

Small current flowing through the nail
→Suppression of heat generation

No coating

Large current flowing through the nail
→Sudden heat generation

FIG.4A    FIG.4B    FIG.4C    FIG.4D
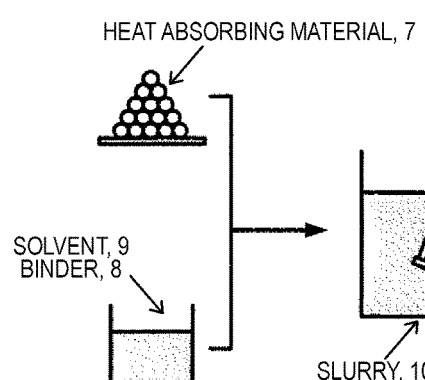
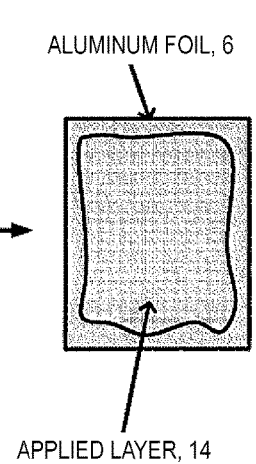
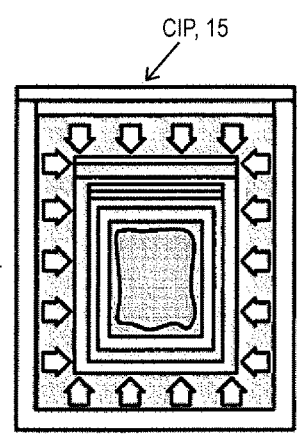

SULFIDE ALL-SOLID-STATE BATTERY

FIELD

The present disclosure relates to sulfide all-solid-state batteries containing heat absorbing layers.

BACKGROUND

Batteries sometimes generate heat suddenly due to short circuits and so on. In this case, heat can be absorbed properly by providing a heat absorbing layer in part of a battery. Inorganic hydrates such as calcium sulfate dihydrate are known as materials constituting heat absorbing layers (Patent Literature 1).

CITATION LIST

Patent Literature

Patent Literature 1: JP 2009-266402A

SUMMARY

Technical Problem

According to findings of the inventors of the present disclosure, when a heat absorbing layer containing an inorganic hydrate is provided in a sulfide all-solid-state battery, moisture is released from the inorganic hydrate at a battery operating temperature (for example, 60° C.) and reacts with a battery material (for example, a sulfide solid electrolyte), and the battery material gradually deteriorates. As a result, when a battery is used for a long period of time, capacity of the battery largely reduces.

An object of one embodiment of the present disclosure is to provide a sulfide all-solid-state battery capable of absorbing heat by a heat absorbing layer at abnormal heat generation from the battery and maintaining capacity of the battery at a high level when the battery is used for a long period of time.

Solution to Problem

One embodiment of the present disclosure employs the following structures in order to solve the above problem. That is, one embodiment of the present disclosure is a sulfide all-solid-state battery comprising: at least one unit cell, at least one heat absorbing layer, a battery case which accommodates the unit cell and the heat absorbing layer, the unit cell contains sulfide solid electrolyte and the heat absorbing layer contains at least one kind of an organic heat absorbing material selected from the group consisting of a sugar alcohol and a hydrocarbon, and the heat absorbing layer which does not contain an inorganic hydrate.

"Unit cell" refers to a battery unit that can be discharged or charged by an electrochemical reaction. A sulfide solid electrolyte is essentially contained in the unit cell. For example, in the unit cell, ions move between a cathode and an anode via a solid electrolyte layer containing a sulfide solid electrolyte.

"Heat absorbing layer" refers to a layer which contains heat absorbing materials. In addition to heat absorbing materials, a binder or the like may be contained.

"Organic heat absorbing material" refers to an organic material that exists as a solid during normal condition of the battery, and absorbs heat by melting when the battery extraordinary generates heat. Both sugar alcohols and hydrocarbons satisfy these conditions.

"Battery case" houses at least the unit cell and the heat absorbing layer. That is, the unit cell and the heat absorbing layer exist in one space inside the battery case.

According to the present disclosure, preferably, a plurality of the above unit cells are layered to form a laminated battery, and the above heat absorbing layer is provided inside the above laminated battery.

According to the present disclosure, preferably, a plurality of the unit cells are layered to form a laminated battery, and the heat absorbing layer is provided on at least one surface of both end faces in the layered direction of the laminated battery.

According to the present disclosure, preferably, the above organic heat absorbing material has a melting point of 70° C. or more and 250° C. or less.

According to the present disclosure, the heat absorbing layer contains mannitol as the above organic heat absorbing material.

Advantageous Effects of Invention

According to the present disclosure, a heat absorbing layer contains a sugar alcohol and/or a hydrocarbon as a heat absorbing material, but does not contain an inorganic hydrate. Sugar alcohols and hydrocarbons do not release hydration water at an operating temperature of a battery, and deterioration of battery materials contained in a unit cell (for example, sulfide solid electrolytes) can be suppressed. That is, even if the battery is operated for a long period of time, the decrease in capacity can be suppressed. On the other hand, sugar alcohols and hydrocarbons melt (fuse) when the battery extraordinarily generates heat, whereby heat can be appropriately absorbed. As described above, according to the present disclosure, heat can be absorbed by the heat absorbing layer when the battery extraordinary generates heat, and even when the battery is operated for a long time, capacity of the battery can be maintained at a high level.

BRIEF DESCRIPTION OF DRAWINGS

FIGS. 4A to 4D are schematic view to explain a manufacturing procedure of a heat absorbing sheet in the examples;

DESCRIPTION OF EMBODIMENTS

Figure 1:
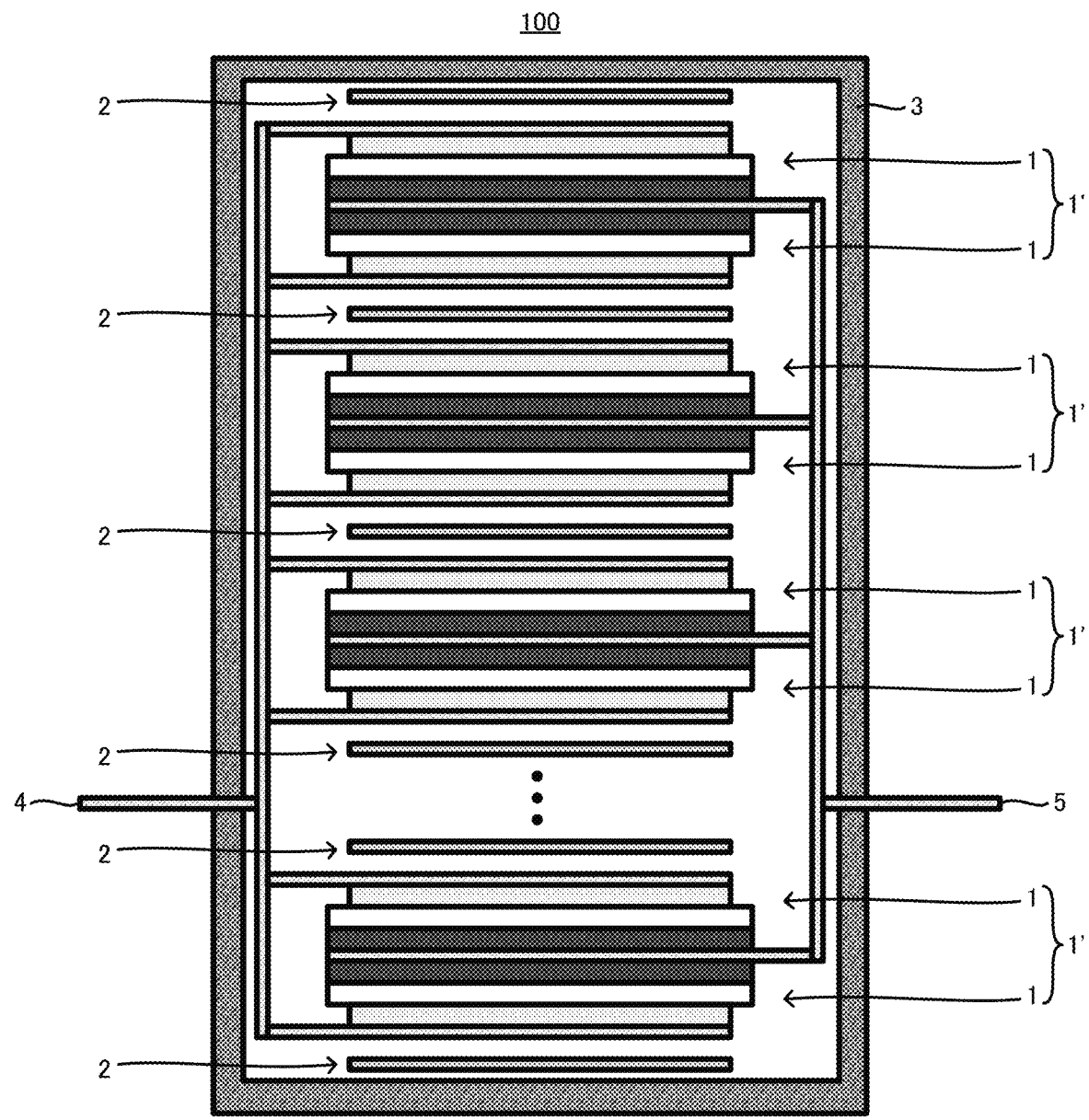
FIG. 1 is a schematic view to explain a configuration of a sulfide all-solid-state battery 10.
Figure 2:
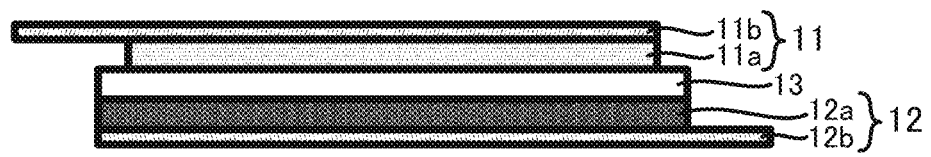
FIG. 2 is a schematic view to explain a configuration of a unit cell 1.

FIG. 1 schematically shows a configuration (sectional configuration) of a sulfide all-solid-state battery 100. FIG. 2 schematically shows a configuration (sectional configuration) of a unit cell 1 which is one of the constituent elements of the sulfide all-solid-state battery 100.

As shown in FIG. 1, the sulfide all-solid-state battery 100 contains at least one unit cell 1, at least one heat absorbing layer 2, and a battery case 3 housing the unit cell 1 and the heat absorbing layer 2. In the sulfide all-solid-state battery 100, the unit cell 1 contains a sulfide solid electrolyte. In addition, the heat absorbing layer 2 contains at least one organic heat absorbing material selected from the group consisting of sugar alcohols and hydrocarbons. Furthermore, the heat absorbing layer 2 does not contain an inorganic hydrate. In FIG. 1, for the convenience of explanation, space is provided between the unit cell 1 and the heat absorbing layer 2, but preferably the unit cell 1 and the heat absorbing layer 2 are in contact with each other.

1. Unit Cell

The unit cell 1 is a battery unit capable of being discharged and charged by an electrochemical reaction. Electricity generated in the unit cell 1 is taken out to the outside via a current collector and a tab. The unit cell 1 essentially contains a sulfide solid electrolyte. For example, in the unit cell 1, ions move between a cathode and an anode via a solid electrolyte layer containing a sulfide solid electrolyte. Needless to say, the unit cell 1 is an all-solid-state unit cell and does not contain an electrolyte. In a case of an electrolyte battery, since an electrolyte and a heat absorbing layer may react with each other, it is necessary to provide a separate layer or the like between the electrolyte and the heat absorbing layer in order to prevent their contact. As a result, volumetric energy density decreases as the whole battery. On the other hand, in the case of an all-solid-state unit cell, such provision is not necessary, and it is also possible to provide the heat absorbing layer 2 so as to be in contact with the unit cell 1 as described later. The configuration of the unit cell 1 containing a sulfide solid electrolyte is obvious, but it will be explained with specific examples below just to make sure.

Hereinafter, a lithium all-solid-state battery will be exemplified and explained as the unit cell 1. In the present disclosure, an all-solid-state battery applicable to the unit cell 1 is not limited to a lithium battery and may be a sodium ion battery, a copper ion battery, a silver ion battery or another metal ion battery in accordance with purposes. However, because of its high energy density, it is preferable to use a lithium all-solid-state battery. In addition, the unit cell may be a primary battery, and may be a rechargeable battery. It is noted that abnormal heat generation from the battery tends to occur when the battery is used for a long time while charged and discharged repeatedly. That is, a rechargeable battery is preferred to a primary battery in view of making the above described effect more outstanding.

1.1. Cathode and Anode

As shown in FIG. 2, the unit cell 1 contains a cathode 11 and an anode 12. The cathode 11 contains a cathode mixture layer 11a and a cathode current collector 11b, and the anode 12 contains an anode mixture layer 12a and an anode current collector 12b.

1.1.1 Cathode Mixture Layer and Anode Mixture Layer

Each of the cathode mixture layer 11a and the anode mixture layer 12a at least contains an active material, and optionally, further contains solid electrolyte, binder and a conductive additive. As the active material, any active material capable of storing and releasing ions can be used. Among active materials, two different materials in electric potential at which ions are stored and released (charge and discharge potential) are selected, and a material displaying noble potential can be used as a cathode active material and a material displaying base potential can be used as an anode active material. When a lithium battery is constituted, examples of cathode active materials include lithium cobaltite, lithium nickelate, $Li_{1+\alpha}Ni_{1/3}Mn_{1/3}Co_{1/3}O_2$, lithium manganate, spinel type lithium composite oxide and lithium-containing composite oxide such as lithium titanate, examples of anode active materials include carbon materials such as graphite and hard carbon, Si, Si alloys, $Li_4Ti_5O_{12}$. Furthermore, the cathode active material may have a coating layer of lithium niobate or the like on its surface. The solid electrolyte is preferably inorganic solid electrolyte. This is because ion conductivity of inorganic solid electrolyte is high compared with organic polymer electrolyte. Also, this is because inorganic solid electrolyte is superior in heat resistance compared with organic polymer electrolyte. Preferable examples of the solid electrolytes include oxide solid electrolytes such as $Li_3PO_4$ and sulfide solid electrolytes such as $Li_2S-P_2S_5$, $Li_2S-SiS_2$, $LiI-Li_2S-SiS_2$, $LiI-Si_2S-P_2S_5$, $LiI-Li_2S-P_2O_5$ and $LiI-Li_3PO_4-P_2S_5$. Among them, sulfide solid electrolytes containing $Li_2S-P_2S_5$ are particularly preferable. As the binder, any known binder such as butadiene rubber (BR), styrene butadiene rubber (SBR), and acrylate butadiene rubber (ABR), and polyvinylidene fluoride (PVdF) can be used. As the conductive additive, a carbon material such as acetylene black or ktjenblack, a metal material such as nickel, aluminum, and stainless steel can be used. Contents of each constituent in the cathode active material layer 11a and the anode active material layer 12a, and a shape and thickness of each cathode active material layer 11a and the anode active material layer 12a may be the same as conventional ones. Each cathode active material layer 11a and the anode active material layer 12a can be made by, for example, mixing the active material, the optionally contained solid electrolyte, the binder and the conductive additive in a solvent, and kneading the mixture to obtain a slurry state electrode composition, then applying the electrode composition to the surface of the current collector, and drying it.

1.1.2 Cathode Current Collector and Anode Current Collector

The cathode current collector 11b and the anode current collector 12b may be composed of metal foil, metal mesh or the like. Especially, metal foil is preferable. In a case where metal foil is used as the current collectors, the heat absorbing layer is not directly in contact with the cathode active material layer and/or the anode active material layer even if the heat absorbing layer is arranged on the surface of any collector, and the heat absorbing layer and battery materials do not react with each other. Examples of metal that can constitute the cathode current collector 11b contain stainless steel, Ni, Cr, Au, Pt, Al, Fe, Ti, and Zn. Examples of metal that can constitute the anode current collector 12b contain stainless steel, Cu, Ni, Fe, Ti, Co, and Zn.

1.2. Solid Electrolyte Layer

As shown in FIG. 2, the unit cell 1 contains a solid electrolyte layer 13 between the cathode 11 and the anode 12. The solid electrolyte layer 13 essentially contains the above-described sulfide solid electrolyte as a solid electrolyte. In the solid electrolyte layer 13, another solid electrolyte (the above mentioned oxide solid electrolyte or the like)

may be contained together with the sulfide solid electrolyte. The solid electrolyte layer 13 optionally contains a binder. As the binder, a binder same as that used for the cathode or the anode can be used. A content of each component and the shape and thickness of the solid electrolyte layer 13 can be the same as conventional ones. The solid electrolyte layer 13 can be made by mixing solid electrolyte and the optionally contained binder in a solvent and kneading the mixture to obtain a slurry electrolyte composition, then coating the electrolyte composition on the surface of a base material and drying it, or the like.

1.3. Laminated Battery

The above-described respective layers are laminated and integrated to form the unit cell 1. The number of the unit cell 1 provided for the sulfide all-solid-state battery 100 is not particularly limited, and which may be at least one. In particular, preferably, a laminated battery is formed by laminating a plurality of the unit cells 1. For example, in the sulfide all-solid-state battery 100 shown in FIG. 1, one unit cell 1 and another unit cell 1 share a current collector (anode current collector 12*b*) and are integrated to form a unit cell composite 1', and a plurality of unit cell complexes 1' are laminated and connected in parallel with each other, thereby forming a laminated battery. In FIG. 1, the layered direction of each layer in the unit cell 1 and the layered direction of a plurality of the unit cell complexes 1' in the laminated battery are the same. By adopting such a form, a laminated battery of a high volumetric energy density can be obtained. In addition, the current collector shared in the unit cell composite 1' is not limited to the anode current collector 12*b*, and the cathode current collector 11*b* may be shared.

Although FIG. 1 shows a mode in which the two unit cells 1 and 1 are integrated by sharing the anode current collector 12*b*, the number of the unit cells 1 to be integrated may be at least two. However, in the view of making a laminated battery with fewer warps easier to be provided or the like, it is preferable that the number of the unit cells 1 to be integrated be an even number (2, 4, 6, . . . ). In this case, it is preferable that one cell 1 and another cell 1 share one current collector 11*b* or 12*b*.

2. Heat Absorbing Layer

The heat absorbing layer 2 is a layer containing a heat absorbing material, and a binder may be contained in addition to the heat absorbing material. The heat absorbing layer 2 has one feature of containing at least one organic heat absorbing material selected from the group consisting of sugar alcohols and hydrocarbons as a heat absorbing material. Further, the heat absorbing layer 2 has another feature of not containing an inorganic hydrate.

2.1. Organic Heat Absorbing Material

The heat absorbing layer 2 contains at least one organic heat absorbing material selected from the group consisting of sugar alcohols and hydrocarbons. While existing as a solid when the battery is in an ordinary state, this organic heat absorbing material melts to absorb the heat when the battery generates heat extraordinarily.

According to the findings of the present disclosure, sugar alcohols and hydrocarbons are materials that: (I) absorb heat by melting; (II) can be plastically deformed and easily layered; and (III) do not release water at an operating temperature of the battery. Therefore, it is considered that even if any of sugar alcohols and hydrocarbons is contained in the heat absorbing layer, the above-described desired effect is obtained.

Examples of sugar alcohols contain mannitol, xylitol, erythritol, lactitol, maltitol, sorbitol, and galactitol. On the other hand, examples of hydrocarbons contain anthracene, and hectane. In view of having a larger endothermic amount, sugar alcohols are preferable to hydrocarbons, and mannitol is particularly preferable. Mannitol has a larger endothermic amount than other sugar alcohols. In addition, even after melting and functioning as a heat absorbing layer, mannitol is easily solidified again by cooling. That is, it is considered that mannitol can be used repeatedly as a heat absorbing material.

As described above, any organic heat absorbing material can be used as long as it exists as a solid during normal operation of the battery, and it absorbs heat by melting when the battery extraordinary generates heat. In particular, the organic heat absorbing material preferably has a melting point of 70° C. to 250° C. Alternatively, the organic heat absorbing material preferably has an endothermic onset temperature and an endothermic peak temperature within the range of 70° C. to 250° C. Alternatively, such an organic heat absorbing material is preferable that its endothermic reaction be completed within the range of 70° C. to 250° C. as to a DSC curve obtained from differential scanning calorimetry (under an argon atmosphere, the heating rate: 10° C./min). When the organic heat absorbing material has such characteristics, it is possible to absorb heat from the battery in a more appropriate temperature range.

A content of the organic heat absorbing material in the heat absorbing layer 2 is not particularly limited. The heat absorbing layer 2 preferably contains the organic heat absorbing material in an amount of 80% by mass or more, more preferably 95% by mass or more. The upper limit is not particularly limited. For example, it is also preferable that the heat absorbing layer 2 contain only one organic heat absorbing material in addition to the optionally contained binder.

2.2. Inorganic Hydrate

The heat absorbing layer 2 does not contain an inorganic hydrate. An inorganic hydrate slightly releases water (water of hydration) even at the operating temperature of the battery (60° C.). A battery material of a sulfide solid battery (for example, a sulfide solid electrolyte) reacts with even such a slight amount of water and deteriorates. By substantially excluding an inorganic hydrate from the heat absorbing layer 2, such a problem does not occur.

2.3. Other Components

The heat absorbing layer 2 optionally contains a binder in addition to the organic heat absorbing material. The binder binds the organic heat absorbing materials more firmly to each other. Any binder can be used as long as it does not cause a chemical reaction to the organic heat absorbing material. Various binders such as butadiene rubber (BR) and polyvinylidene difluoride (PVdF) can be used. A content of the binder in the heat absorbing layer 2 is not particularly limited. The heat absorbing layer 2 preferably contains the binder in an amount of 20% by mass or less, more preferably 5% by mass or less. The lower limit is not particularly limited, and may be 0% by mass. As described above, the organic heat absorbing material can be plastically deformed and can be formed into a certain shape by pressure or the like. Therefore, it is possible to constitute the heat absorbing layer 2 only with the organic heat absorbing material without containing a binder.

The heat absorbing layer 2 may contain components other than the organic heat absorbing material and the binder as long as the performance of the heat absorbing layer 2 is not spoiled. An inorganic material which does not release moisture as described above may be contained. However, it is preferable that the heat absorbing layer 2 do not contain an inorganic material. For example, an inorganic hydroxide may chemically react with the above-mentioned organic heat absorbing material. Since only the organic heat absorbing material exerts sufficient heat absorbing performance, even if an inorganic material is not contained in the heat absorbing layer 2, it is preferable that the heat absorbing layer 2 contain only the organic heat absorbing material except for the optional binder.

A shape of the heat absorbing layer 2 may be suitably determined according to the shape of the battery, but it is preferably sheet-shaped. In this case, thickness of the heat absorbing layer 2 is preferably 5 μm or more and 500 μm or less. The lower limit of the heat absorbing layer 2 is more preferably 0.1 μm or more, and the upper limit is more preferably 1000 μm or less. By making the heat absorbing layer 2 into a sheet shape, the volume ratio of the heat absorbing layer to the battery can be reduced. Furthermore, the heat absorbing layer 2 is excellent in moldability and flexibility compared with a conventional one made of an inorganic hydrate, by containing the above organic heat absorbing material capable of plastic deformation. That is, even if the heat absorbing layer 2 is thinned, it is hard to be broken.

The heat absorbing layer 2 preferably has compactness of 80% or more. More preferably, the compactness is 85% or more. Such high compactness can be achieved by containing the organic heat absorbing material in the heat absorbing layer 2. When the compactness is high, the endothermic amount per unit volume can be increased. In addition, since heat from the battery can be quickly spread into the heat absorbing layer, such an effect is brought about that heat can be absorbed promptly against abnormal heat generation of the battery. The "compactness" of the heat absorbing layer is calculated as follows. First, weight and volume of the heat absorbing layer are measured and its density is calculated. The compactness can be calculated by dividing the calculated density by true density.

A method for making the heat absorbing layer 2 is not particularly limited. For example, the heat absorbing layer can be made by shaping the above organic heat absorbing material and a binder as an optional component, which are mixed into any shape. Both dry shaping and wet shaping may be applied. For example, in a case of dry shaping, the heat absorbing layers 2 having any shape can be made by mixing the above-mentioned respective components and press shaping the mixture while optionally heating the mixture. Alternatively, depending on the material, it is considered possible to be shaped after melting the organic heat absorbing material and the optional binder. On the other hand, in the case of wet shaping, each of the above components is added to a solvent to form a solution or slurry, the solution or slurry is coated on a base material, dried, and optionally pressed to form the sheet-shaped heat absorbing layer as described above. As the solvent, for example, heptane, ethanol, N-methylpyrrolidone, butyl acetate, or butyl butyrate can be used.

3. Battery Case

A material and shape of the battery case 3 are not particularly limited as long as the battery case can house the unit cell 1 and the heat absorbing layer 2. For example, a housing made of metal, a laminate film made by laminating metal foil and resin film, and so on can be used as the battery case 3. Also, a plurality of the battery cases 3 containing the unit cell 1 and the heat absorbing layer 2 may be prepared and further enclosed in an exterior body to form the sulfide all-solid-state battery 100.

4. Installation Form of Unit Cell and Heat Absorbing Layer in Battery Case

4.1. Installation Form of Heat Absorbing Layer for Unit Cell

At least one unit cell 1 and at least one heat absorbing layer 2 are housed in the battery case 3. That is, it is sufficient that the unit cell 1 and the heat absorbing layer 2 are present in one space within the battery case 3. In particular, in the battery case 3, it is preferable that the unit cell 1 and the heat absorbing layer 2 be in contact with each other. By providing the heat absorbing layer 2 in the vicinity of the unit cell 1 which is a heat source, the heat absorbing layer 2 can efficiently absorb heat when the battery extraordinary heats up. In addition, since the unit cell 1 and the heat absorbing layer 2 are in contact with each other, the shutdown effect described below is easily obtained.

Figure 3A:
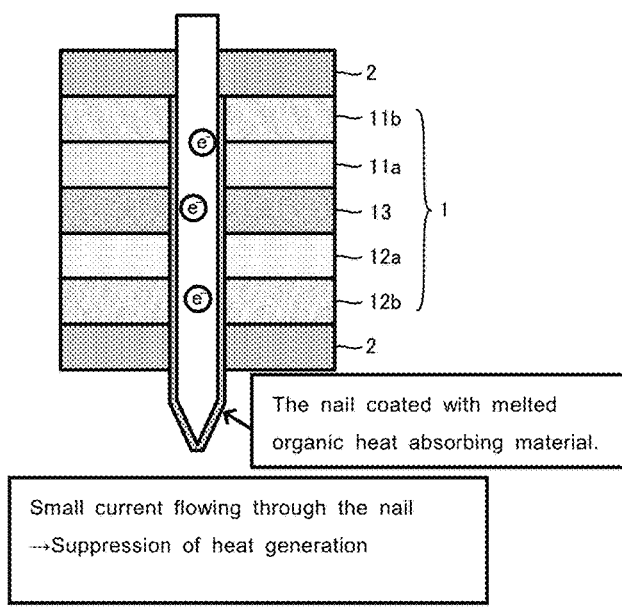
FIGS. 3A and 3B are schematic view to explain a shutdown effect.
Figure 3B:
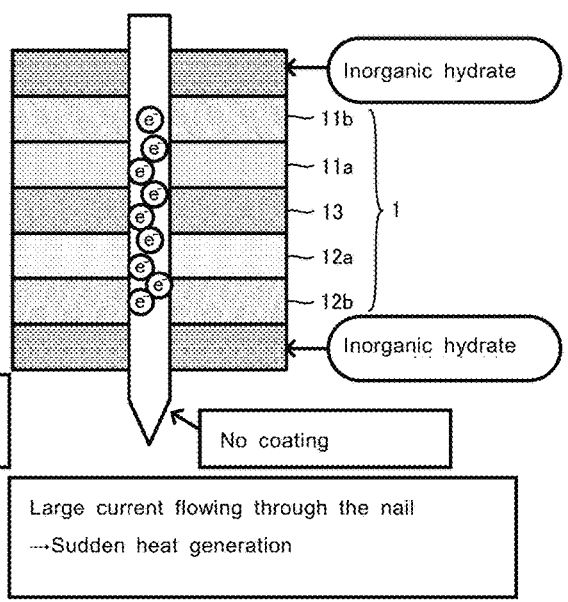

That is, when the heat absorbing layer 2 containing a sugar alcohol and/or a hydrocarbon is arranged so as to be in contact with the unit cell 1, as shown in FIG. 3, in a nail penetration test on the unit cell 1, a melted sugar alcohol and/or a hydrocarbon can adhere around the nail. In this case, a current flow through the nail at the time of nail penetration can be reduced, and as a result, an effect of suppressing abnormal heat generation of the unit cell 1 (shutdown effect) is obtained (FIG. 3A). Such an effect cannot be obtained with an inorganic hydrate that absorbs heat by evaporation of hydrated water (FIG. 3B).

When the heat absorbing layer 2 is sandwiched between base materials (metallic foil or the like), it is preferable that the heat absorbing layer 2 be indirectly in contact with the unit cell 1 via the base material sheet. In the present application, it is assumed that the heat absorbing layer 2 is in contact with the unit cell 1 even when the heat absorbing layer 2 is indirectly in contact with the unit cell 1 via the base material.

When the above shutdown effect is to be exerted more remarkably, as shown in FIGS. 3A and 3B, it is preferable that the layered direction of the cathode current collector 11b, the cathode mixture layer 11a, the solid electrolyte layer 13, the anode mixture layer 12a, and the anode current collector 12b in the unit cell 1 and the layered direction of the unit cell 1 and the heat absorbing layer 2 be the same.

4.2. Installation Form of Heat Absorbing Layer for Laminated Battery

In the case where a plurality of the unit cells 1 is laminated to form the laminated battery, it is preferable that the heat absorbing layer 2 be arranged inside the laminated battery. For example, in the case of the laminated battery, the heat absorbing layer 2 can be installed so as to be sandwiched between the layers of the laminated battery. Specifically, the heat absorbing layer 2 can be interposed between a plurality of the unit cells 1. In this case, the heat absorbing layer 2 is preferably in contact with at least one of the cathode current collector and the anode current collector of the unit cell 1.

In particular, as shown in FIG. 1, when one unit cell 1 and another unit cell 1 share the current collector (anode collector 12b) and are integrated to form the unit cell complex 1', a plurality of the unit cell complexes 1' are laminated and connected in parallel to each other, and the laminated direction of each layer in the unit cell 1 is same as with the laminated direction of a plurality of the unit cell complexes 1' in the laminated battery, it is possible to install the heat absorbing layer 2 between the outer current collector (cathode current collector 11b) of one unit cell complex 1' and the outer current collector (cathode current collector 11b) of the other unit cell complex 1. In this form, all of the unit cells 1 are in contact with the heat absorbing layers 2 inside the laminated battery, and when abnormal heat generation occurs in one unit cell 1, the heat absorbing layer 2 can quickly absorb the heat and suppress propagation of the heat to the other unit cells.

Alternatively, in the case where a plurality of the unit cells 1 are laminated to form the laminated battery, it is also preferable that the heat absorbing layer 2 be provided for at least one surface of both end faces in the laminated direction of the laminated battery. In particular, as shown in FIG. 1, it is the most preferable that the heat absorbing layer 2 be provided for each surface of both end faces in the laminated direction of the laminated battery and inside the laminated battery. In the case where the heat absorbing layer 2 is provided in the outermost surface side of the laminated battery, at the time of the nail penetration test along the laminated direction of the laminated battery, since the nail contacts the heat absorbing layer 2 before contacting the unit cell 1, the shutdown effect described above is likely to be exerted more remarkably.

5. Other Compositions

The sulfide all-solid-state battery 100 has an obvious structure as a battery in addition to the above-described unit cell 1, the heat absorbing layer 2 and the battery case 3. For example, as shown in FIG. 1, in the sulfide all-solid-state battery 100, electricity generated in the unit cell 1 is taken to the outside via tabs 4 and 5. Also, the unit cell 1 is charged through the tabs 4 and 5. The tab 4 is connected to the cathode current collector 11b of the unit cell 1 and the tab 5 is connected to the anode current collector 12b of the unit cell 1. Materials and shapes of the tabs 4 and 5 may be the same as conventional ones.

As described above, in the sulfide all-solid-state battery 100, the heat absorbing layer 2 contains a sugar alcohol and/or hydrocarbon as the heat absorbing material, but does not contain an inorganic hydrate. Sugar alcohols and hydrocarbons do not release water of hydration at the operating temperature of the battery and deterioration of the battery material contained in the unit cell 1 (for example, sulfide solid electrolyte) can be suppressed. That is, even if the battery is operated for a long time, the decrease in capacity can be suppressed. On the other hand, sugar alcohols and hydrocarbons melt (fuse) when the battery extraordinary heats up, thereby absorb the heat appropriately. From the above, according to the sulfide all-solid-state battery 100, heat can be absorbed by the heat absorbing layer 2 when the battery extraordinary heats up, and the capacity of the battery can be maintained at a high level even when the battery is operated over a long period of time.

EXAMPLES

1. Making Heat Absorbing Sheet

In the flow shown in FIGS. 4A to 4D, a heat absorbing layer was formed on aluminum foil 6. First, a heat absorbing material 7 and a binder 8 (BR base, manufactured by JSR) were weighed so that the heat absorbing material: the binder was 97:3 by weight ratio, and they were added to a solvent 9 (heptane) (FIG. 4A), and solids were dispersed with an ultrasonic homogenizer to form a slurry 10 (FIG. 4B). The obtained slurry was applied over the aluminum foil (FIG. 4C) to be dried, after stuck, two sheets 14 of the resultants were pressurized with CIP 15 by 4 t (FIG. 4D), and the heat absorbing layer was formed between two sheets of the aluminum foils.

Four kinds of heat absorbing sheets were prepared by changing the composition of the heat absorbing material. The following Table 1 shows the composition of the heat absorbing material contained in the heat absorbing layer for each of the heat absorbing sheets 1 to 4.

TABLE 1

| | | Inorganic Hydrate | |
|---|---|---|---|
| | Sugar Alcohol Mannitol (Mass Part) | Calcium Sulfate Dihydrate (Mass Part) | Zirconium Sulfate Tetrahydrate (Mass Part) |
| Heat Absorbing Sheet 1 | 50 | 50 | 0 |
| Heat Absorbing Sheet 2 | 50 | 0 | 50 |
| Heat Absorbing Sheet 3 | 0 | 100 | 0 |
| Heat Absorbing Sheet 4 | 100 | 0 | 0 |

2. Making Unit Cell 2.1. Making Cathode Active Material

Lithium niobate was coated on cathode active material particles (particles with $Li_{1.15}Ni_{1/3}Co_{1/3}Mn_{1/3}W_{0.005}O_2$ as the main phase) with a tumbling fluidizing-type coating machine (manufactured by Powrex Corporation) under the atmosphere, and fired under the atmosphere. Then, a cathode active material particle coated with layers of lithium niobate was obtained.

2.2. Making Cathode

Butyl butyrate solution of butyl butyrate, and a 5 wt % PVdF based binder (manufactured by Kureha Corporation), the above cathode active material particles, sulfide solid electrolyte (Li2S—P2S5 based glass ceramic containing LiI and LiBr with an average particle diameter of 0.8 μm) and VGCF (manufactured by Showa Denko KK) as a conductive additive were added, and the resultant was stirred for 30 seconds in a polypropylene container with an ultrasonic dispersion device (UH-50, manufactured by SMT Co., Ltd.). Next, then container was shaken with a shaker (TTM-1 manufactured by Shibata Scientific Technology Ltd.) for 3 minutes and further stirred with an ultrasonic dispersion device for 30 seconds. After shaking with the shaker for 3 minutes, it was coated on aluminum foil (manufactured by Nippon Foil manufacturing) by a blade method using an applicator. Thereafter, it was air-dried naturally and dried on a hot plate at 100° C. for 30 minutes to obtain a cathode containing a cathode mixture layer on the aluminum foil (cathode current collector)

2.3 Making Anode

Butyl butyrate solution of butyl butyrate, and a 5 wt % PvdF based binder (manufactured by Kureha Corporation), anode active material particles (silicon particles, average particle diameter 5 μm, manufactured by Kojundo Chemical Laboratory Co., Ltd.) and the same sulfide solid electrolyte as described above were added, and the resultant was stirred for 30 seconds in a polypropylene container with an ultrasonic dispersing device (UH-50, manufactured by SMT Co., Ltd.). Next, the container was shaken with a shaker (TTM-1 manufactured by Shibata Scientific Technology Ltd.) for 30 minutes and further stirred with an ultrasonic dispersion device for 30 seconds. After shaking with the shaker for 3 minutes, it was coated on copper foil by a blade method using an applicator. Thereafter, it was air-dried naturally and dried on a hot plate at 100° C. for 30 minutes to obtain an anode having an anode mixture layer on the copper foil (anode current collector).

2.4. Making Solid Electrolyte Layer

Heptane solution of heptane, and a 5 wt % BR based binder (manufactured by JSR Corporation), and a sulfide solid electrolyte ($Li_2S$—$P_2S_5$ based glass ceramic containing LiI and LiBr with an average particle diameter of 2.5 μm) were added, and the resultant was stirred for 30 seconds with an ultrasonic dispersing device (UH-50 manufactured by SMT Co., Ltd.). Next, the container was shaken with the shaker (TTM-1 manufactured by Shibata Scientific Co., Ltd.) for 30 minutes and further stirred with an ultrasonic dispersion device for 30 seconds. After shaking with a shaker for 3 minutes, it was coated on aluminum foil by a blade method using an applicator. After that, it was air-dried and dried on a hot plate at 100° C. for 30 minutes to form a solid electrolyte layer on the aluminum foil as a base material.

2.5. Making Unit Cell

The anode punched into a circle of 1.08 $cm^2$ and the solid electrolyte layer punched into a circle of 1.08 $cm^2$ were bonded together so that the anode mixture layer and the solid electrolyte layer were in direct contact with each other, pressed at 6 $t/cm^2$, thereafter the aluminum foil as a base material was peeled off. Subsequently, the cathode punched into a circle of 1 $cm^2$ was bonded so that the cathode mixture layer and the solid electrolyte layer were in direct contact with each other, and pressed at 6 $t/cm^2$, whereby a unit cell containing the solid electrolyte layer between the cathode and the anode was obtained.

3. Making Sulfide All-Solid-State Battery

Figure 5:
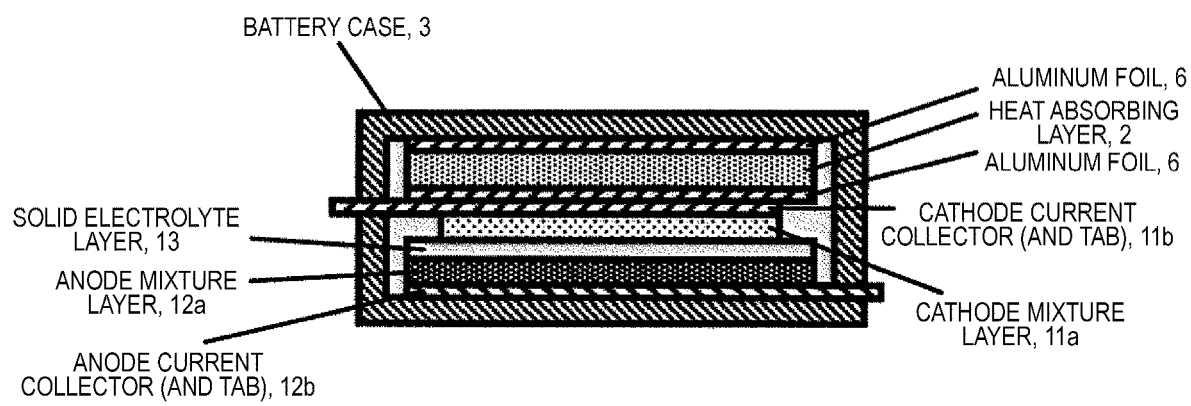
FIG. 5 is a schematic view to explain a configuration of a sulfide all-solid-state battery evaluated in the examples.

As shown in FIG. 5, one of the heat absorbing sheets 1 to 4 was laminated on the surface of the cathode current collector of the unit cell and they are housed in a battery case 3 (laminate of aluminum and a resin film) to make a laminate cell (Comparative Examples 1 to 3, Example 1). FIG. 5 depicts battery case 3 with the following layers from top to bottom: aluminum foil 6 as a base material, heat adsorbing layer 2, aluminum foil 6 as a base material, cathode collector (and tab) 11b, cathode mixture layer 11a, solid electrolyte layer 13, anode mixture layer 12a, and anode collector (and tab) 12b. On the other hand, a laminate cell in which only a unit cell was housed in a battery case without layering a heat absorbing sheet was also made for reference (Comparative Example 4).

4. Evaluation of Endothermic Amount of Heat Absorbing Sheet

The endothermic amount was measured when each of a sugar alcohol and an inorganic hydrate was used as a heat absorbing sheet. The endothermic amount was measured with a DSC device (manufactured by HITACHI, DSC 7000 X series). A pan that was used was open. The heating rate was 10° C./min. The measurement was carried out within the temperature range of 50° C. to 500° C. under an argon atmosphere. A heat absorbing sheet having an endotherm amount of 500 $J/cm^3$ or higher were evaluated as good, and less than 500 $J/cm^3$ were evaluated as bad. The results are shown in Table 2 below.

5. Evaluation of Capacity Retention Ratio of Sulfide All-Solid-State Battery Under the following conditions, the initial capacity of the sulfide all-solid-state battery and the capacity after the storage test were checked and the capacity retention rate was obtained from the ratio of the initial capacity and the capacity after the storage test (the battery constraint pressure was 19 MPa). The results are shown in Table 2 below. In Table 2, the value of the capacity maintenance rate is a value normalized with the capacity maintenance rate of Comparative Example 4 (when no heat absorbing sheet is provided) taken as 100.

Initial Capacity

CC-CV charge was performed at 25° C. at 0.33 C in the range of 3 V to 4.35 V, and CC-CV discharge was performed to obtain the initial capacity.

Storage Test Condition

Voltage was adjusted to 4.08 V with CC-CV charging and left as it was for 32 days under 60° C. In addition, "60° C." simulates the operating temperature of the battery.

Capacity after the Storage Test

CC-CV charge was performed on the batteries after the storage test at 25° C. at 0.33 C. in the range of 3 V to 4.35 V, and CC-CV discharge was performed to obtain the capacity after the storage test.

TABLE 2

| | Type of Heat Absorbing Sheet | Presence or Absence of Inorganic Hydrate (Occupying Ratio of Organic Heat Absorbing Material) | Capacity Retention Rate | Endothermic Amount |
|---|---|---|---|---|
| Example 1 | Heat Absorbing Sheet 4 | Absence (100% by mass) | 100 | Good |
| Comparative Example 1 | Heat Absorbing Sheet 1 | Presence (50% by mass) | 51 | Good |

TABLE 2-continued

|  | Type of Heat Absorbing Sheet | Presence or Absence of Inorganic Hydrate (Occupying Ratio of Organic Heat Absorbing Material) | Capacity Retention Rate | Endothermic Amount |
|---|---|---|---|---|
| Comparative Example 2 | Heat Absorbing Sheet 2 | Presence (50% by mass) | 82 | Good |
| Comparative Example 3 | Heat Absorbing Sheet 3 | Presence (0% by mass) | 46 | Good |
| Comparative Example 4 | No Heat Absorbing Sheet | — | 100 | Bad |

As is clear from the results shown in Table 2, Example 1 (Sulfide solid state battery containing a sugar alcohol and heat absorbing material not containing an inorganic hydrate) could maintain high capacity even after the storage test, and deterioration of the battery material due to the provision of the heat absorbing layer was not observed. In addition, the heat absorbing material containing a sugar alcohol had a large endothermic amount, and the endothermic performance was almost the same as that of the conventional inorganic hydrate.

On the other hand, Comparative Examples 1 to 3 (sulfide solid-state battery using a heat absorbing material containing an inorganic hydrate) had an endothermic performance, but the capacity of the battery remarkably decreased after the storage test, and it was not able to withstand actual use. It is considered that hydrated water was released from the inorganic hydrate at 60° C., and the battery material deteriorated.

In the above examples, mannitol was used as the organic heat absorbing material, but it is obvious that the same effect is obtained even when a sugar alcohol other than mannitol is used as the organic heat absorbing material. A sugar alcohol other than mannitol is also a material (I) that absorbs heat by melting, (II) can be plastically deformed and can be easily layered, and (III) that does not release water at a battery operating temperature.

In the above examples, a sugar alcohol was used as the organic heat absorbing material, but it is obvious that the same effect is obtained even when a hydrocarbon is used as the organic heat absorbing material. Similarly to sugar alcohols, hydrocarbons are also a material (I) that absorbs heat by melting, (II) can be plastically deformed and can be easily layered, and (III) that does not release water at a battery operating temperature.

Figure 6:
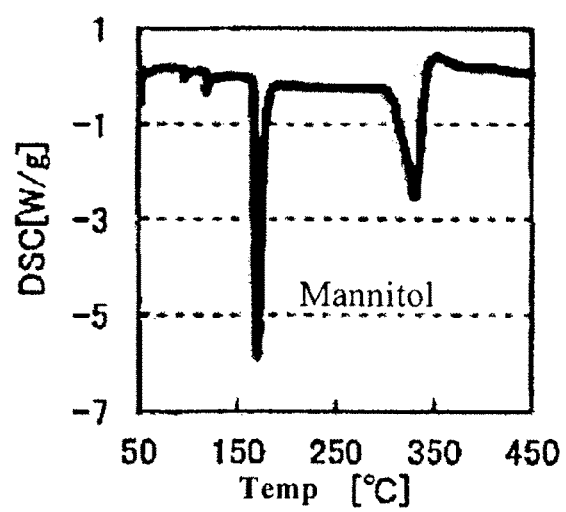
FIG. 6 shows graphs to show DSC curves of mannitol, xylitol, and anthracene.
Figure 6:
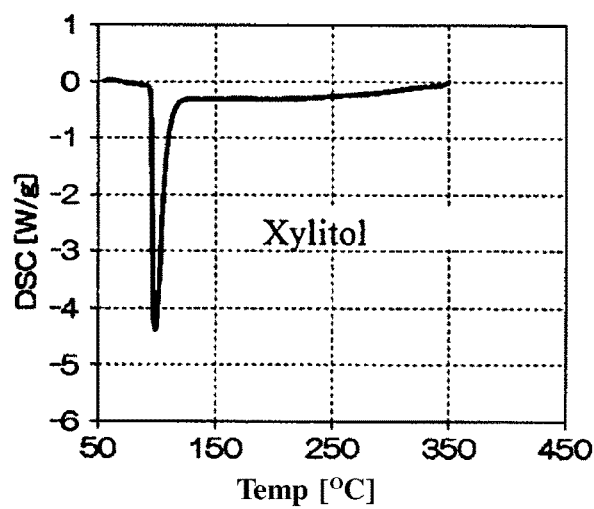
Figure 6:
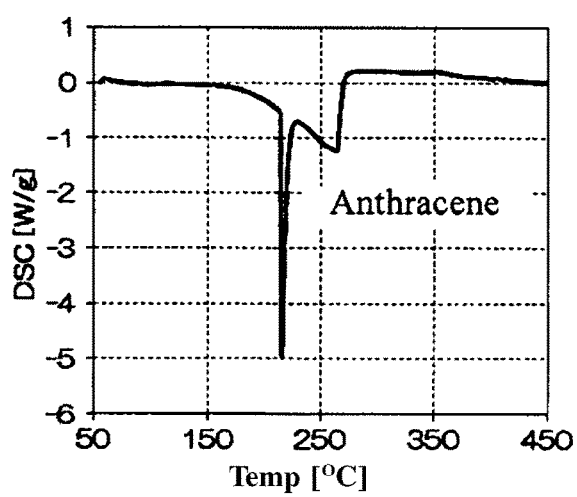

For reference, FIG. 6 shows DSC curves respectively for mannitol, xylitol as a sugar alcohol other than mannitol, and anthracene as a hydrocarbon. As shown in FIG. 6, it is clear that even with xylitol or anthracene, like mannitol, it exerts endothermic performance by melting at a prescribed temperature. In addition, in terms of chemical structure, water (hydrated water) is not released even when heated, and degradation of the battery material due to water release is not a concern.

INDUSTRIAL APPLICABILITY

The sulfide all-solid-state battery according to the present disclosure can be used, for example, as a power source for mounting on a vehicle.

REFERENCE SIGNS LIST 1 unit cell
2 heat absorbing layer
3 battery case
11 cathode
12 anode
13 solid electrolyte layer
100 sulfide all-solid-state battery

What is claimed is:

1. A sulfide all-solid-state battery comprising:
   at least one unit cell;
   at least one heat absorbing layer;
   a battery case which houses the unit cell and the heat absorbing layer;
   wherein no heat absorbing layer is in direct contact with the battery case,
   the unit cell contains a sulfide solid electrolyte,
   the heat absorbing layer does not contain an inorganic hydrate,
   when the battery has one unit cell, at least one heat absorbing layer is in direct contact with a current collector of the unit cell or is in direct contact with a metallic foil base layer which is in direct contact with a current collector of the unit cell,
   when the battery has a plurality of unit cells, the unit cells are laminated to form a laminated battery, and at least one heat absorbing layer is in direct contact with one or both end faces of the laminated battery, and
   the heat absorbing layer contains mannitol as the organic heat absorbing material, and the sulfide solid electrolyte contains $Li_2S$—$P_2S_5$.

2. The sulfide all-solid-state battery according to claim 1, wherein a plurality of the unit cells are laminated to form the laminated battery, and the heat absorbing layer is provided inside the laminated battery.

3. The sulfide all-solid-state battery according to claim 1, wherein a plurality of the unit cells are laminated to form the laminated battery.

4. The sulfide all-solid-state battery according to claim 3, wherein heat absorbing layers are present between adjacent unit cells.

5. The sulfide all-solid-state battery according to claim 1, wherein the heat absorbing layer contains the organic heat absorbing material in an amount of 80% by mass or more.

6. The sulfide all-solid-state battery according to claim 1, wherein the heat absorbing layer contains the organic heat absorbing material in an amount of 90% by mass or more.

7. The sulfide all-solid-state battery according to claim 1, wherein the heat absorbing layer contains the organic heat absorbing material in an amount of 95% by mass or more.

8. The sulfide all-solid-state battery according to claim 1, wherein the heat absorbing layer consists of the organic heat absorbing material.

9. The sulfide all-solid-state battery according to claim 1, wherein only one organic heat absorbing material is present in the heat absorbing layer.

10. The sulfide all-solid-state battery according to claim 1, wherein the heat absorbing layer consists of the organic heat absorbing material and a binder in an amount greater than 0% but not greater than 5% by mass.

11. The sulfide all-solid-state battery according to claim 10, wherein the binder is butadiene rubber or polyvinylidene difluoride.

12. The sulfide all-solid-state battery according to claim 1, wherein the heat absorbing layer contains no inorganic material.

13. The sulfide all-solid-state battery according to claim 1, wherein the heat absorbing layer has compactness of 80% or more.

14. The sulfide all-solid-state battery according to claim 1, wherein the heat absorbing layer has compactness of 85% or more.

15. The sulfide all-solid-state battery according to claim 1, wherein the heat absorbing layer is formed between two sheets of metal current collector foils.

16. The sulfide all-solid-state battery according to claim 1, wherein the heat absorbing layer is sheet-shaped, and
- a plurality of unit cells are laminated to form the laminated battery, and at least one heat absorbing layer is in direct contact with a surface of a current collector arranged on one or both end faces of the laminated battery.

* * * * *